US006760335B1

(12) United States Patent
Andersson et al.

(10) Patent No.: US 6,760,335 B1
(45) Date of Patent: Jul. 6, 2004

(54) DYNAMIC AAL2 PATH CONFIGURATION IN ATM SYSTEM

(75) Inventors: Staffan Andersson, Enskede (SE); Mikael Agnevik, Nacka (SE); Ola Engstrom, Bandhagan (SE); Anders Knuutinen, Skarpnäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 731 days.

(21) Appl. No.: 09/756,229

(22) Filed: Jan. 9, 2001

(51) Int. Cl.[7] ............................................. H04L 12/28
(52) U.S. Cl. ............................... 370/395.2; 370/395.64
(58) Field of Search ......................... 370/395.1, 395.2, 370/395.21, 395.3, 395.4, 395.41, 395.64, 395.6, 431, 437, 458, 461, 462.3, 473

(56) References Cited

U.S. PATENT DOCUMENTS

| | | | |
|---|---|---|---|
| 4,669,113 A | | 5/1987 | Ash et al. |
| 5,936,951 A | | 8/1999 | Andersson et al. |
| 5,940,370 A | | 8/1999 | Curtis et al. |
| 5,953,339 A | | 9/1999 | Baldwin et al. |
| 5,982,783 A | | 11/1999 | Frey et al. |
| 6,049,530 A | * | 4/2000 | Petersen et al. ............. 370/248 |
| 6,169,738 B1 | * | 1/2001 | Sriram et al. .......... 370/395.21 |
| 6,483,838 B1 | * | 11/2002 | Ostman et al. ......... 370/395.31 |
| 6,574,224 B1 | * | 6/2003 | Brueckheimer et al. . 370/395.6 |
| 6,597,698 B1 | * | 7/2003 | Lundbäck et al. .......... 370/398 |
| 6,654,376 B1 | * | 11/2003 | Stacey et al. .......... 370/395.21 |
| 6,714,543 B1 | * | 3/2004 | Brueckheimer et al. . 370/395.1 |

FOREIGN PATENT DOCUMENTS

| | | |
|---|---|---|
| WO | WO 99/33316 | 7/1999 |
| WO | WO 99/55095 | 10/1999 |
| WO | WO 00/62494 | 10/2000 |

OTHER PUBLICATIONS

Eneroth et al., "Applying ATM/AAL2 as a Switching Technology in Third Generation Mobile Access Networks", IEEE Communications Magazine, vol. 37, No. 6, Jun. 1999, pp. 112–122, XP000835287.

EPO Standard Search Report, May 16, 2001.

* cited by examiner

*Primary Examiner*—David Vincent
(74) *Attorney, Agent, or Firm*—Nixon & Vanderhye, P.C.

(57) ABSTRACT

AAL2 (ATM Adaptation Layer 2) paths are dynamically established and/or released in an ATM (Asynchronous Transfer Mode) network/system. For purposes of example, during network operation a determination(s) may be made as to whether AAL2 mux (i.e., multiplexor(s) and/or demultiplexor(s)) resources are lacking and/or excessive relating to a particular AAL2 signaling relation(s). When AAL2 mux resources are determined as lacking for the AAL2 signaling relation, then at least one AAL2 mux is added to the relation. However, when AAL2 mux resources are determined as excessive for the AAL2 signaling relation, then at least one AAL2 mux is removed or dropped from the relation. AAL2 paths may be selectively and dynamically added and/or dropped from an AAL2 signaling relation in response to the above determinations. In such a manner, ATM resources can be preserved and not wasted thereby resulting in a more efficient ATM AAL2 system/network.

16 Claims, 10 Drawing Sheets

DYNAMIC AAL2 PATH CONFIGURATION IN ATM SYSTEM

This invention relates to dynamic AAL2 path allocation/configuration in an ATM system/network. More particularly, certain embodiments of this invention relate to determining when to add and/or drop AAL2 mux(es) to/from an AAL2 signaling relation between two or more ATM nodes, and proceeding to add and/or drop AAL2 mux(es) based upon a result of such a determination.

BACKGROUND AND SUMMARY OF THE INVENTION

Asynchronous Transfer Mode (ATM) is becoming increasingly used in communication networks. ATM is a packet-oriented transfer mode which uses asynchronous time division multiplexing techniques. Packets are called cells and have a fixed size. See, for example, U.S. Ser. No. 09/188,347 (hereby incorporated herein by reference) for a description of certain aspects of ATM technology. See also WO 99/33316, which corresponds to Ser. No. 09/188,347 in certain respects.

Figure 1:
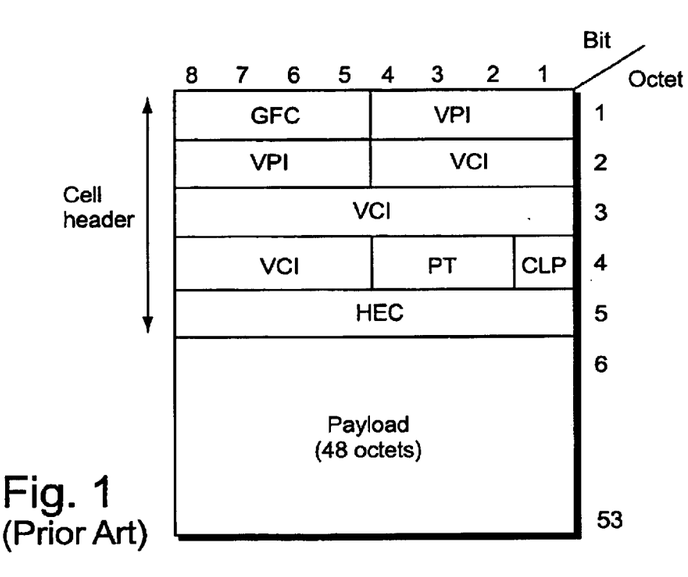
FIG. 1 is a diagrammatic view showing the format of an ATM cell.

As shown in FIG. 1, an ATM cell typically includes or consists of 53 octets, five of which may form a header and forty eight of which may constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; while the virtual channel is one specific connection on a respective principal path. Compressed voice (e.g., cellular telecommunications systems) is an application to which ATM (and AAL2 below) is well adapted and used in.

Between termination points of an ATM network a plurality of nodes are typically situated, such as ATM switching nodes having ports which are connected together by physical transmission paths or links. The switching nodes each typically have several functional parts, a primary of which is an ATM switch core. The switch core essentially functions like a cross-connect between ports of the switch. Paths internal to the switch core are selectively controlled so that particular ports of the switch are connected together to allow a cells ultimately to travel from an ingress side of the switch to an egress side of the switch.

A protocol reference model has been developed for illustrating layering of ATM. The protocol reference model layers include (from lower to higher layers) a physical layer (including both a physical medium sublayer and a transmission convergence sublayer), an ATM layer, an ATM adaptation layer (AAL), and higher layers. The basic purpose of the AAL layer is to isolate the higher layers from specific characteristics of the ATM layer by mapping the higher-layer protocol data units (PDU) into the information field of the ATM cell and vise versa. There are several differing AAL types or categories, including AAL0, AAL1, AAL2, AAL3/4, and AAL5.

Figure 2:
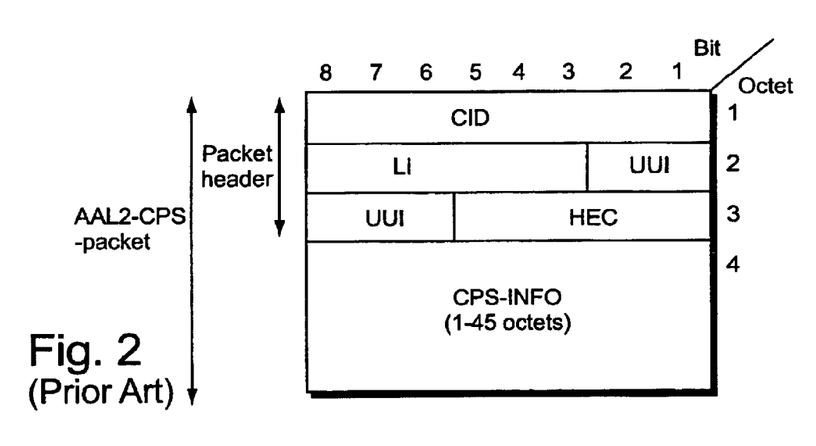
FIG. 2 is a diagrammatic view showing the format of an AAL2 packet.

AAL2 is a standard defined by ITU recommendation I.363.2 (hereby incorporated herein by reference). An AAL2 packet is shown in FIG. 2 as comprising a three octet packet header, as well as a packet payload. The AAL2 packet header includes, for example, an eight bit channel identifier (CID), a six bit length indicator (LI), a five bit User-to-User indicator (UUI), and five bits of header error control (HEC). The AAL2 packet payload, which carries user data, can vary from one to forty-five octets. AAL2 uses ATM virtual connections (VCs) in the ATM layer in such a way that several AAL2 connections can be multiplexed on an ATM VC. The ATM VC is often referred to as an AAL2 path, and each AAL2 connection in the AAL2 path is identified with a channel identifier (CID).

Figure 3:
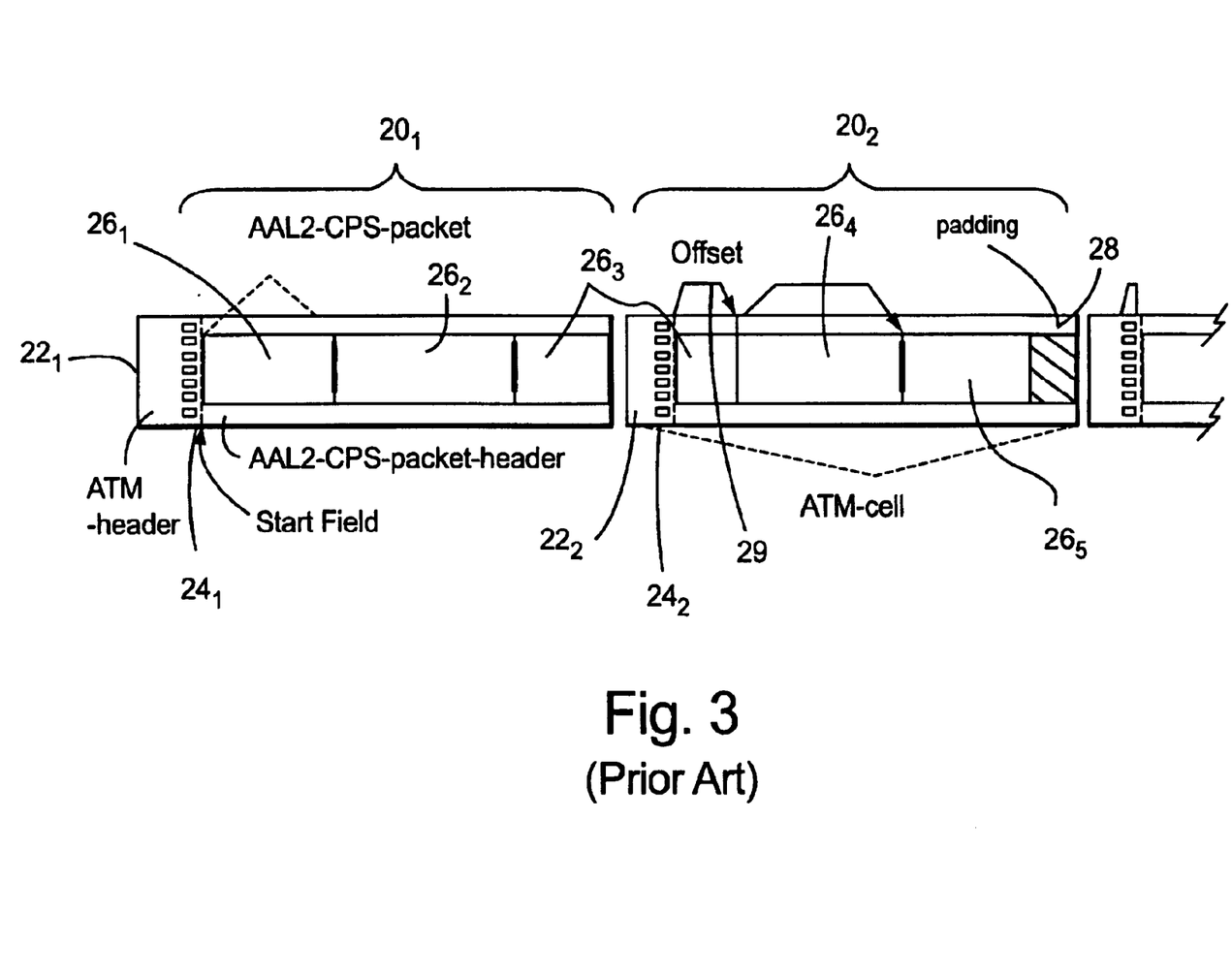
FIG. 3 is a diagrammatic view showing plural AAL2 packets multiplexed into an ATM cell(s).

FIG. 3 shows how plural AAL2 packets can be inserted into a standard ATM cell (i.e., multiplexing). In particular, FIG. 3 shows a first ATM cell $20_1$ and a second ATM cell $20_2$. Each ATM cell 20 has a header 22 (e.g., cell $20_1$ has header $22_1$ and cell $20_2$ has header $22_2$). The payload of the ATM cells 20 begin with a start field 24 (e.g., cell $20_1$ has start field $24_1$ and cell $20_2$ has start field $24_2$). After each start field 24, the ATM cell payload contains AAL2 packets. For example, the payload of ATM cell $20_1$ contains AAL2 packets $26_1$ and $26_2$ in their entirety, as well as a portion of AAL2 packet $26_3$. The payload of cell $20_2$ contains the rest of AAL2 packet $26_3$, and AAL2 packets $26_4$ and $26_5$ in their entirety. In addition, the payload of cell $20_2$ may include padding 28.

Figure 3A:
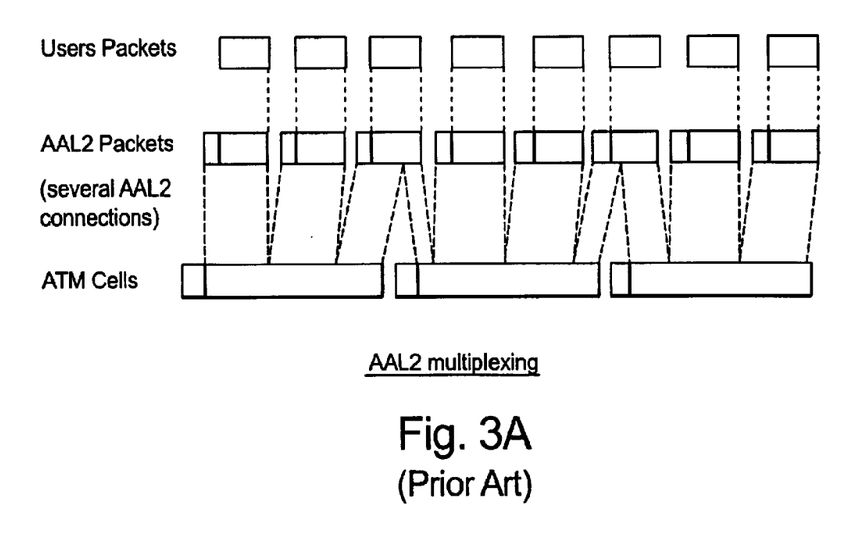
FIG. 3A is another diagrammatic view showing plural AAL2 packets multiplexed into an ATM cell(s).

FIG. 3A illustrates another example of AAL2 multiplexing. The CID in the AAL2 packets provide for multiplexing up to 248 AAL2 connections in a single ATM VCC (virtual channel connection). Thus, AAL2 packets from several AAL2 connections can be multiplexed inside the payload of ATM cells of the ATM link as illustrated in FIG. 3A. FIGS. 3A is similar to FIG. 3 in this regard.

Figure 3B:
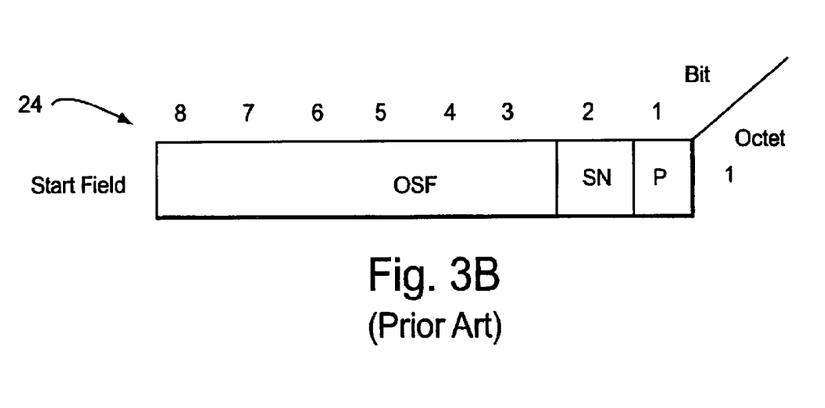
FIG. 3B is a diagrammatic view showing the format of a start field of an AAL2 packet of either FIG. 3 or FIG. 3A.

The start field 24, shown in FIG. 3B, facilitates one AAL2 packet bridging two ATM cells as shown in FIGS. 3 and 3A. Start field 24 may for example include a six bit offset field (OSF), a one bit sequence number (SN), and one parity bit (P). The six bit offset field (OSF) may contain a value, represented by offset displacement 29 in FIG. 3, indicative of the octet in the payload whereat the first full AAL2 packet begins. For ATM cell 201, the value of the offset field (OSF) is one, since AAL2 packet starts just after start field $24_1$. For ATM cell $20_2$, the value of the offset field (OSF) is one (in view of start field 24) plus the number of octets of AAL2 packet $26_3$ protruding into cell $20_2$.

As can be seen, AAL2 advantageously allows multiplexing of data from many users within a single ATM VCC. In such multiplexing scheme, each user's data is typically carried in a separate AAL2 packet, but AAL2 packets of differing users may be carried in the same ATM cells or cells borne on the same ATM VC. Thus, assuming each user has a different channel identifier (CID) value, as many as 248 user channels can be multiplexed onto one ATM VC. AAL2 thus allows more efficient utilization of low speed links than standard ATM while still maintaining low delay properties.

Q.2630.1 (hereby incorporated herein by reference) is an AAL2 signaling standard for setting up and releasing switched AAL2 connections between nodes in an AAL2 network. Signaling between two nodes is handled by a pair of peer AAL2 signaling entities that interwork in an AAL2 signaling relation. The AAL2 capacity of an AAL2 signaling relation includes the group of AAL2 paths and their associated peer AAL2 multiplexor(s)/demultiplexor(s) that are allocated to the relation. Hereinafter, the term "AAL2 mux" is used to denote or mean AAL2 multiplexor and/or AAL2 demultiplexor throughout this patent.

Conventionally, AAL2 paths are established by management operations. Grouping of AAL2 paths to AAL2 signaling relations is also typically handled by management operations. This means that if the AAL2 capacity need for an AAL2 signaling relation changes, an AAL2 path must be setup/released and added/deleted from the AAL2 signaling relation by such management operations.

Unfortunately, needed and/or required AAL2 capacity in an AAL2 signaling relation is often difficult to predict as it can vary significantly over time as a function of many things. This is problematic as management predictions regarding AAL2 capacity are often incorrect or off-mark, which can result is valuable resources being unduly wasted.

In accordance with certain embodiments of this invention, AAL2 paths are dynamically established and/or released in an ATM network/system. For purposes of example, during network operation a determination(s) may be made as to whether AAL2 mux resources are lacking and/or excessive relating to a particular AAL2 signaling relation(s). When AAL2 mux resources are determined as lacking for the AAL2 signaling relation, then at least one AAL2 mux is added to the relation. However, when AAL2 mux resources are determined as excessive for the AAL2 signaling relation, then at least one AAL2 mux is removed or dropped from the relation. AAL2 paths may be selectively and dynamically added and/or dropped from an AAL2 signaling relation in response to the above determinations. In such a manner, ATM resources can be preserved and not wasted thereby resulting in a more efficient ATM AAL2 system/network.

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts. While individual functional blocks and components are shown in many of the figures, those skilled in the art will appreciate that these functions may be performed by individual hardware circuits, by a suitably programmed digital microprocessor or general purpose computer, by an application-specific integrated circuit (ASIC), and/or by one or more digital signal processors (DSPs).

DETAILED DESCRIPTION OF EXAMPLE EMBODIMENTS OF THIS INVENTION

In the following description, for purposes of explanation and not limitation, specific details are set forth, such as particular embodiments, network architectures, and signaling formats, techniques, etc., in order to provide an understanding of the present invention. However, it will be apparent to one skilled in the art that the present invention may be practiced in other embodiments that depart from these specific details. Detailed descriptions of well-known methods, interfaces, devices, protocols, and signaling techniques are omitted so as not to obscure the description of the present invention with unnecessary detail.

In this invention, AAL2 paths (i.e., ATM VCs) are dynamically established and/or released in an ATM network/system. During network operation, a determination(s) is made regarding whether AAL2 mux resources are lacking and/or excessive relating to a particular AAL2 signaling relation(s) between first and second nodes. When lacking, then at least one AAL2 mux is added to the relation. When excessive, then at least one AAL2 mux is removed or dropped from the relation (e.g., the mux having the least number of established AAL2 connections may be released). Additional AAL2 mux(es) may be added/dropped depending upon the degree of lacking/excessive determined. When it is determined that the AAL2 mux resources are neither lacking nor excessive for the AAL2 signaling relation(s) between the two nodes, then no mux is added and no mux is dropped (i.e., the status quo remains). Determinations may be made in such a manner in a continuous or intermittent manner throughout network operation. AAL2 paths may be selectively and dynamically added and/or dropped to/from an AAL2 signaling relation in response to the above determinations, in the context of adding/dropping muxes. In such a manner, ATM resources can be preserved and not wasted, thereby resulting in a more efficient ATM AAL2 system/network.

Figure 6:
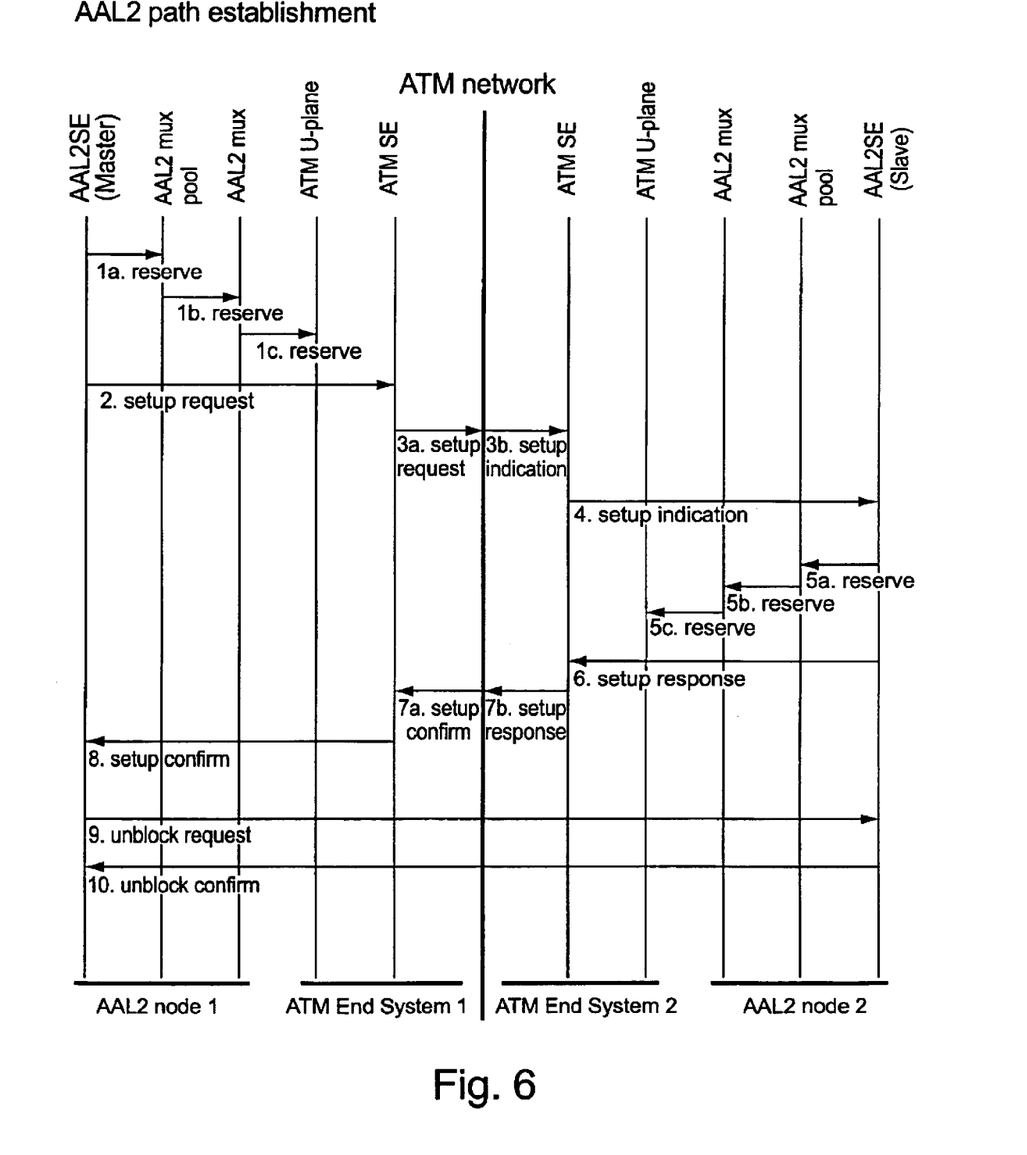
FIG. 6 is a chart illustrating steps taken by different objects in FIGS. 4–5 during the establishment of an AAL2 path according to an embodiment of this invention.
Figure 7:
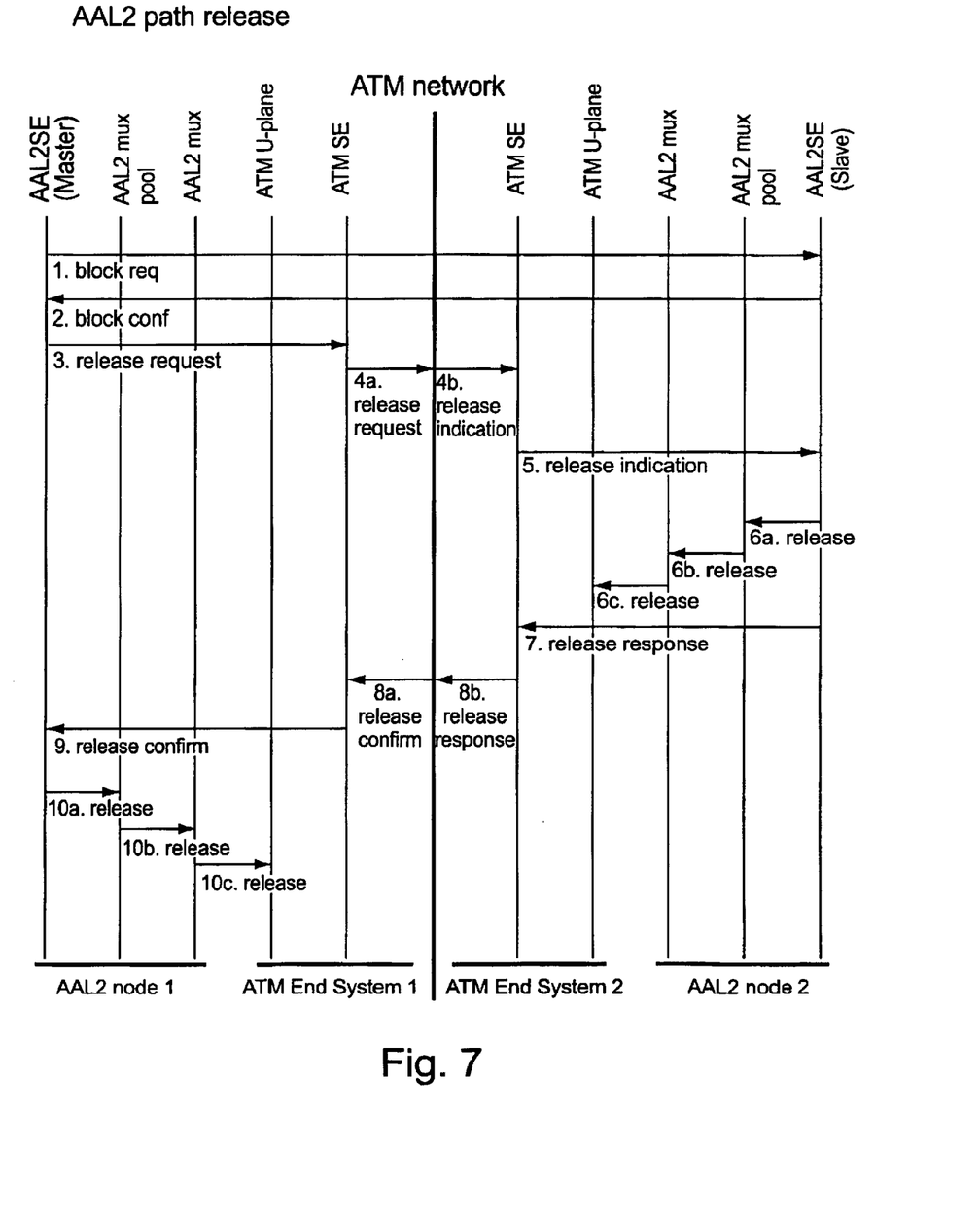
FIG. 7 is a chart illustrating steps taken by different objects in FIGS. 4–5 during the release of an AAL2 path according to an embodiment of this invention.
Figure 8:
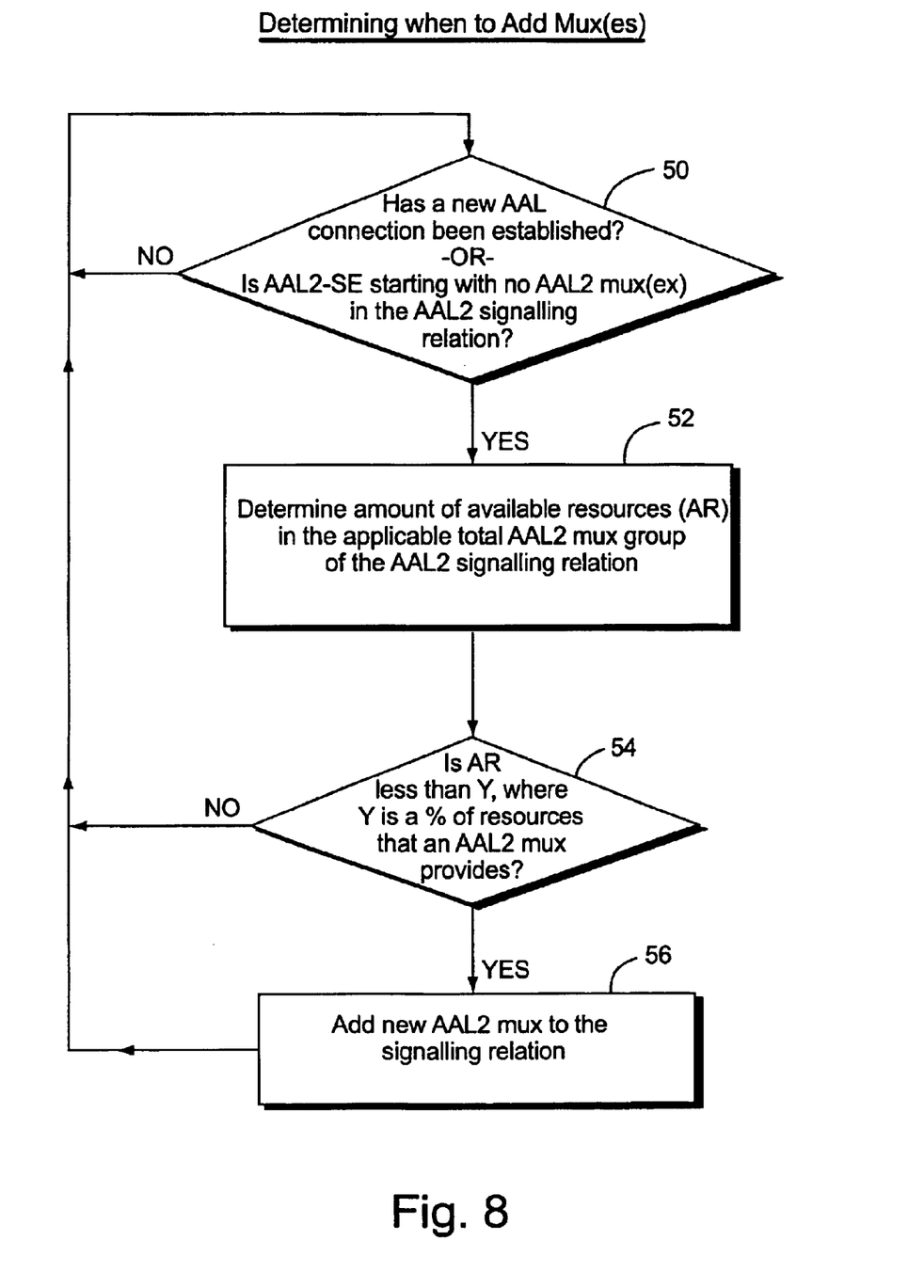
FIG. 8 is a flowchart illustrating certain steps taken during a determination as to whether or not to add AAL2 mux(es) to an AAL2 signaling relation (i.e., determining whether or not AAL2 mux resources are lacking relating to a particular AAL2 signaling relation) according to the FIGS. 4–7 embodiment of this invention.
Figure 9:
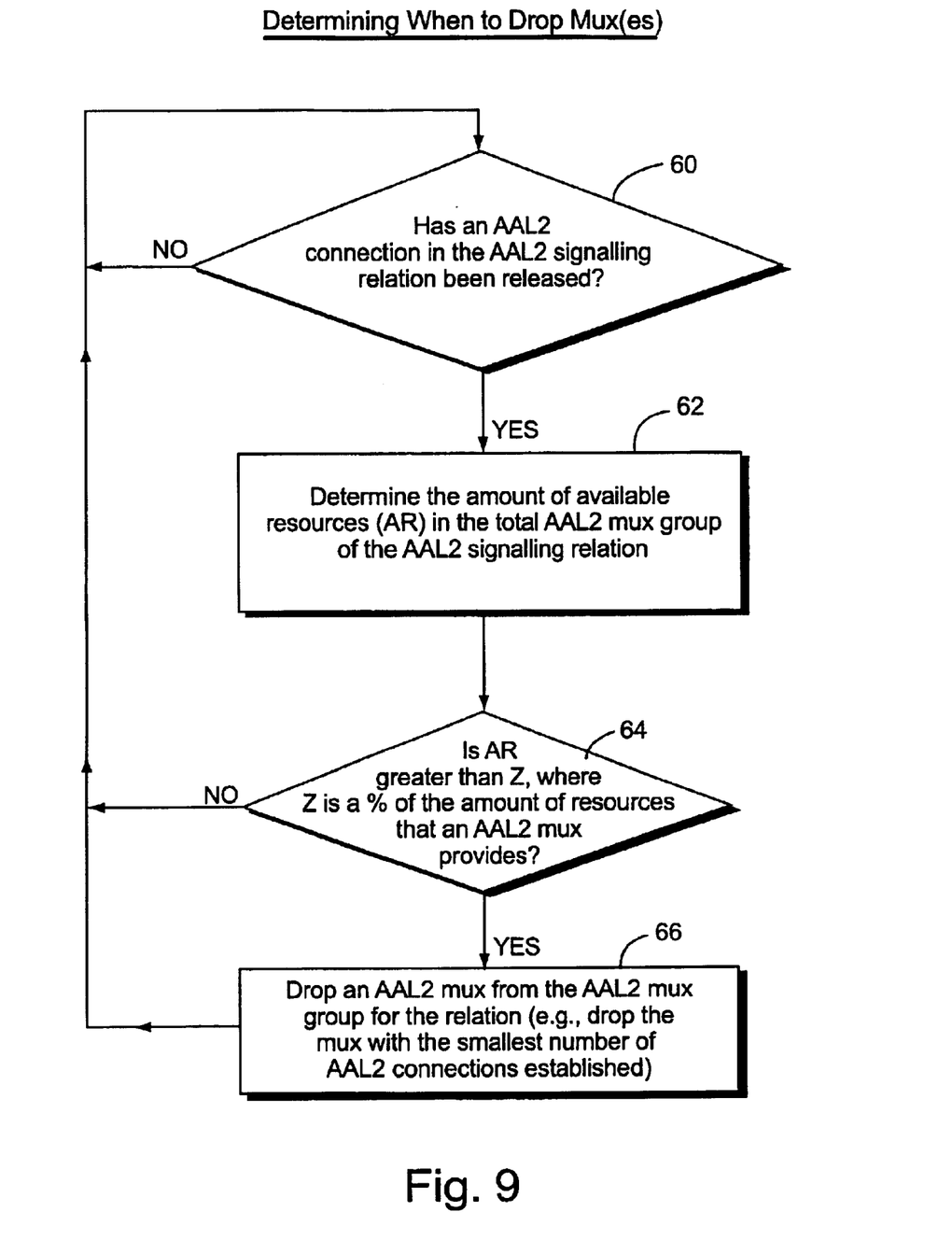
FIG. 9 is a flowchart illustrating certain steps taken during a determination as to whether or not to drop/release AAL2 mux(es) from an AAL2 signaling relation (i.e., determining whether or not AAL2 mux resources are excessive for a particular AAL2 signaling relation) according to the FIGS. 4–8 embodiment of this invention.
Figure 10:
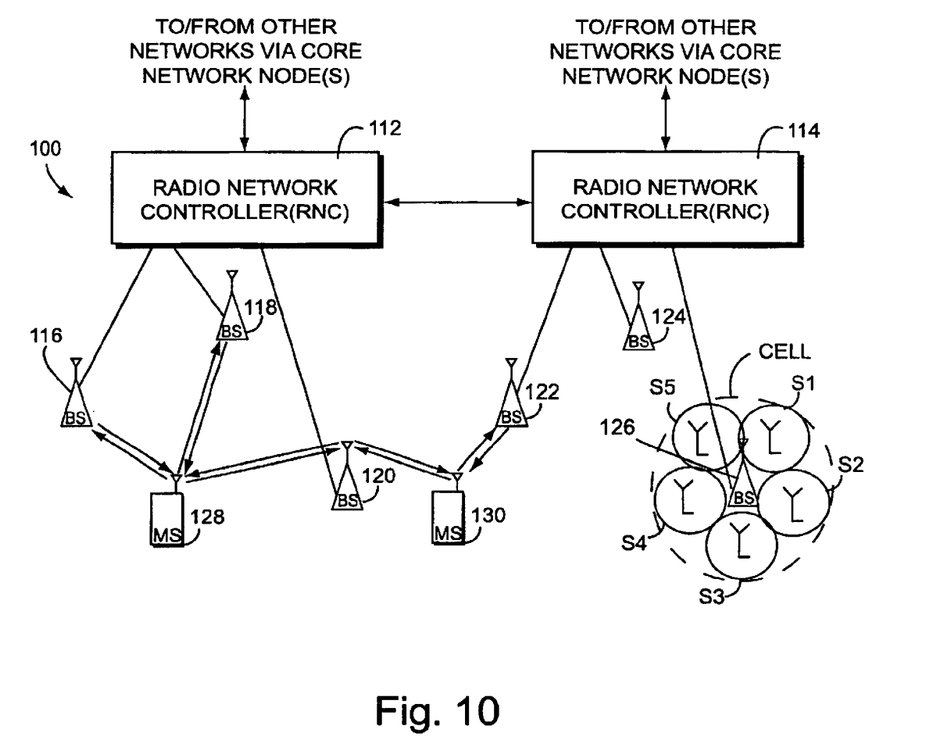
FIG. 10 is a schematic view of a cellular telecommunications network in which the ATM/AAL2 invention of any of the embodiments of FIGS. 1–9 may be implemented according to exemplary different embodiments of this invention.

FIGS. 4–7 illustrate how AAL2 paths are dynamically established/released in an ATM network according to an exemplary embodiment of this invention, while FIGS. 8–9 illustrate exemplary steps which may be carried out in determining whether AAL2 mux resources are excessive, lacking, or neither for a given AAL2 signaling relation. FIG. 10 illustrates various components of an exemplary cellular telecommunications network in which certain embodiments of the instant invention may be implemented.

Figure 4:
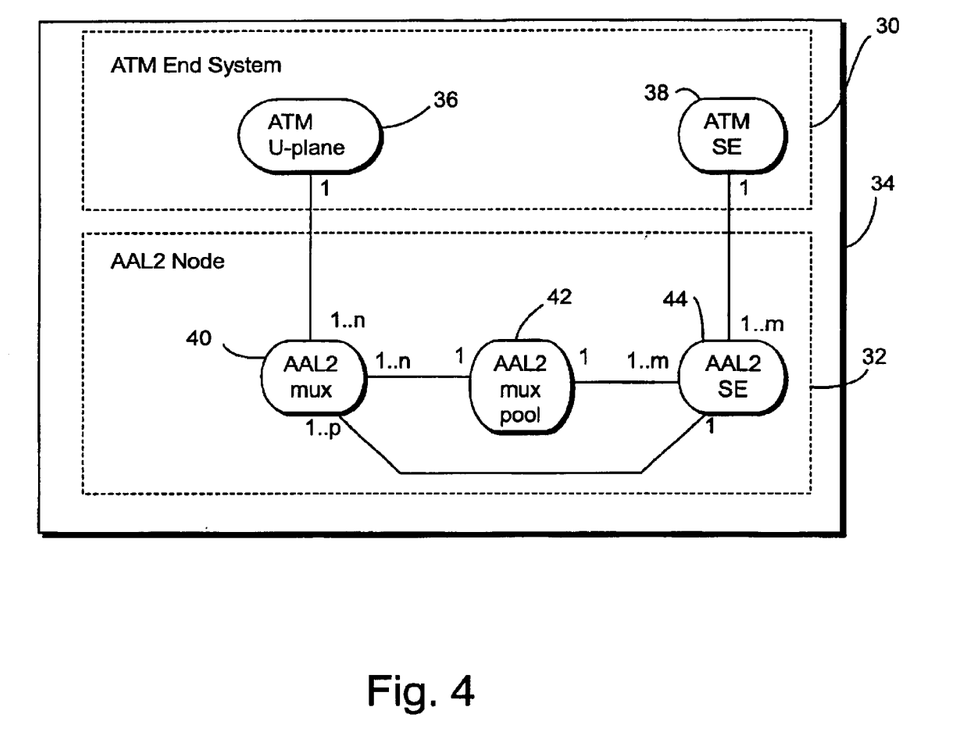
FIG. 4 is a diagrammatic object model illustrating objects involved in AAL2 path establishment/release according to an embodiment of this invention.

FIG. 4 is an object model illustrating certain objects involved in AAL2 path establishment/release for a particular ATM node according to an exemplary embodiment of this invention. ATM end system 30 and AAL2 node 32 may be located at the same node 34 as illustrated in FIG. 4 in certain embodiments, or alternatively may be located at separate/different nodes of an ATM network. In either event, AAL2 node 32 is associated with ATM end system 30, and enables the end system to communication with other ATM nodes throughout the network.

Referring to FIG. 4, ATM end system includes ATM user plane (ATM U-plane) 36 and ATM signaling entity (ATM SE) 38. ATM U-plane 36 is an object which provides the ATM user plane in the ATM end system 30, and provides the capability to interwork with the U-plane of the ATM network (i.e., transfer and receive ATM cells). ATM U-plane also enables AAL2 mux(es) to reserve/release ATM connection access points where ATM service data units are forwarded to/from the AAL2 mux(es). Meanwhile, ATM SE 38 is an object which handles signaling of the ATM end system 30 toward the ATM network to establish/release ATM connections in the ATM network. Signaling in this regard is performed by using known ATM signaling protocol(s) (e.g., B-ISUP or PNNI). ATM SE 38 further enables AAL2 SEs to control establishment/release of ATM connections to be used as AAL2 paths in AAL2 signaling relations. For configuration purposes, an ATM end system address (AESA) is provided for the ATM end system to which the ATM SE belongs.

AAL2 node 32 includes at least one reserved AAL2 mux (i.e., multiplexor and/or demultiplexor) 40, an AAL2 mux pool 42, and at least one AAL2 signaling entity (AAL2 SE) 44. AAL2 mux pool 42 is an object which keeps/stores in memory (e.g., RAM) a list of all AAL2 muxes at the AAL2 node 32. From this pool, AAL2 muxes can be dynamically reserved to serve in any AAL2 signaling relation of the node 32. In preferred embodiments, there is one AAL2 mux pool 42 in each AAL2 node 32 of the ATM network, so that all AAL2 SEs 44 in a given AAL2 node share the same AAL2 mux pool 42. However, in certain alternative embodiments of this invention, a plurality of different mux pools 42 may be provided in an AAL2 node 32 so as to correspond to a plurality of different respective AAL2 SEs 44 at the same node. AAL2 mux 40 is an object which reserves an AAL2 mux at node 32. When an AAL2 mux is reserved in such a manner and used in an AAL2 signaling relation, the AAL2 mux 40 is connected via an established AAL2 path to a peer AAL2 mux in a remote AAL2 node of the ATM network. AAL2 SE 44 is an object which represents a signaling peer in an AAL2 signaling relation between two AAL2 nodes. One AAL2 node 32 can have several AAL2 SEs in certain embodiments of this invention, or only one in other embodiments of this invention. Between two AAL2 nodes 32, there is only one AAL2 signaling relation (which is established between respective AAL2 SEs 44). AAL2 SEs 44 use AAL2 mux(es) 40 from pool 42 to provide multiplexing/demultiplexing of AAL2 connections on established AAL2 paths to remote peer AAL2 nodes, so that ATM cells may be transmitted between different AAL2 nodes. A given AAL2 SE is made aware of the AESA of the remote ATM end system related to the remote AAL2 node where the remote peer AAL2 SE resides. Moreover, a master/slave relationship is typically used between peer AAL2 SEs in different nodes so as to indicate whether an particular AAL2 SE is the master or slave in its AAL2 signaling relation.

In a master/slave relationship used between peer AAL2 SEs, the master is the one that determines whether to add/remove mux(es) to/from the signaling relation. The master is also the one that requests the ATM layer (its ATM SE) to set up/tear down ATM connection(s) used between AAL2 muxes in the signaling relation, and the master also decides whether an AAL2 mux pair in the signaling relation is taken in service or taken out of service, i.e., issuing the Q.2630.1 message "unblock/block."

As will be appreciated by those skilled in the art, the more AAL2 connections to be established from a given AAL2 node 32 for an AAL2 signaling relation, the more AAL2 muxes 40 that need to be used/reserved in order to implement such connections.

Figure 5:
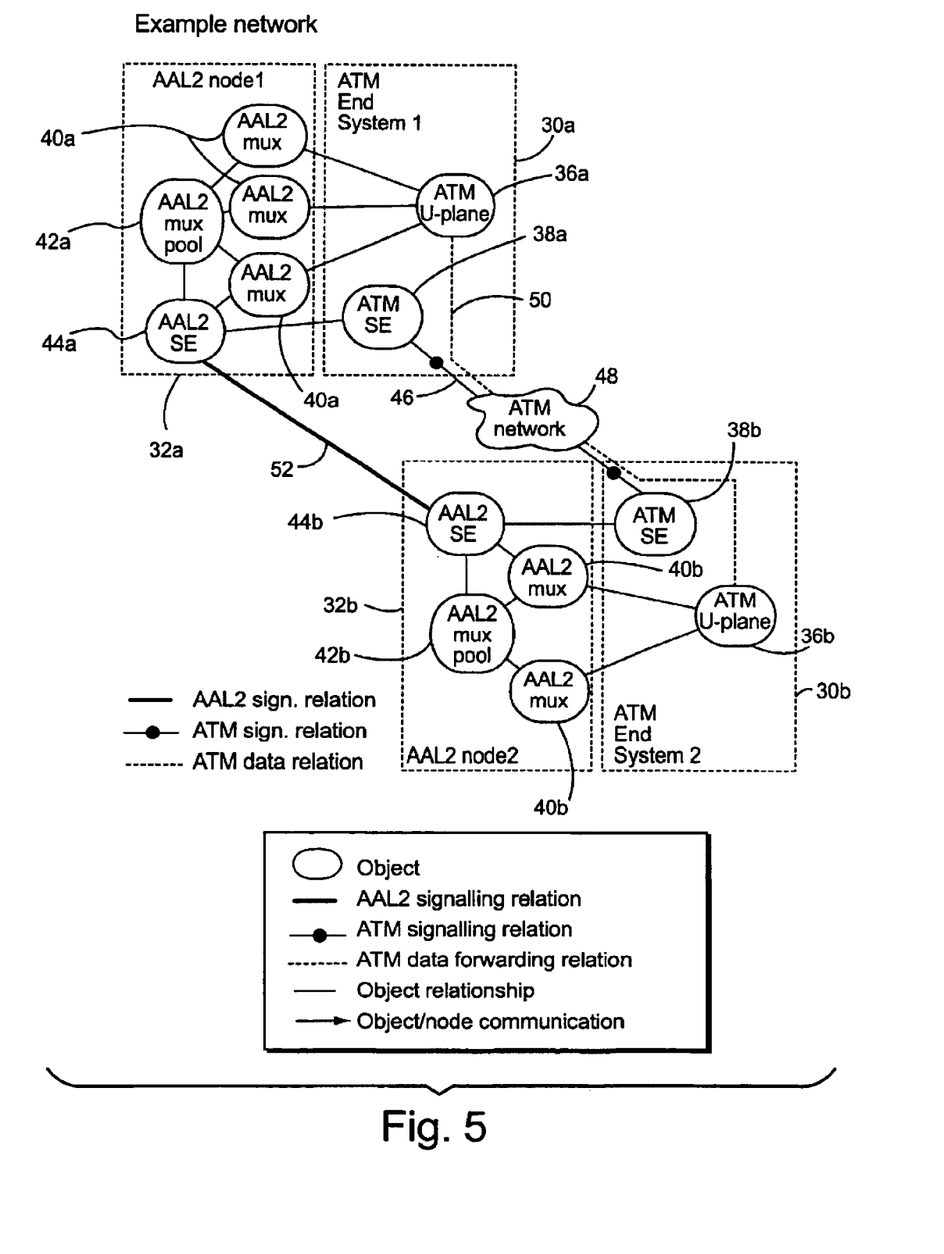
FIG. 5 a schematic view of an exemplary ATM network according to an embodiment of this invention.

FIG. 5 illustrates an exemplary ATM network according to an embodiment of this invention, the network including a first ATM end system 30a, a first AAL2 node 32a related to the first ATM end system 30a, a second ATM end system 30b, and a second AAL2 node 32b related to the second ATM end system 30b. Additional AAL2 nodes and/or ATM end systems may of course be provided in the network, but are omitted from the instant drawings for purposes of simplicity. An ATM signaling relation 46 exists between respective ATM SEs 38a and 38b (via ATM network 48) of the two ATM end systems in communication with one another, while an ATM data relation 50 exists between respective ATM U-planes 36a and 36b of the two ATM end systems in communication with one another. Thus, each ATM end system 30a, 30b has an ATM signaling relation 46 and an ATM data forwarding relation 50 towards an ATM network 48 (for ATM signaling ATM SEs are used, and for ATM data forwarding ATM U-planes are used).

For two AAL2 nodes 32a and 32b in communication with one another via ATM/AAL2, an AAL2 signaling relation 52 exists between respective AAL2 SEs 44a and 44b of the two AAL2 nodes 32a and 32b, respectively. This means that AAL2 paths can be dynamically established between AAL2 node 32a and AAL2 node 32b. Many AAL2 connections between the two AAL2 nodes may be established in this signaling relation 52. Each AAL2 node also has an AAL2 mux pool 42a, 42b with AAL2 muxes 40a, 40b that can be used for the dynamic allocation of AAL2 muxes to AAL2 SEs 44a, 44b.

FIG. 6 shows how an AAL2 path may be established in AAL2 signaling relation 52 (see FIG. 5) according to an exemplary embodiment of this invention. Before describing the establishment of the path, the following pre-conditions are assumed/apply in this embodiment: (1) prior to establishment of the AAL2 path in relation 52, AAL2 SE 44a in first AAL2 node 32a determined/identified a lack of AAL2 mux resources towards second AAL2 node 32b (see FIG. 8 and corresponding description); (2) in an AAL2 signaling relation 52, only one AAL2 path can be established at a time; (3) in AAL2 signaling relation 52 between AAL2 nodes 32a and 32b, AAL2 SE 44a in first AAL2 node 32a is the master and AAL2 SE 44b in the second AAL2 node 32b is the slave (i.e., the master is responsible for initiating establishment of "new" AAL2 paths to be used in the relation 52); and (4) AAL2 SE 44b in AAL2 node 32b has registered (with its configured remote AESA, which in this case is the AESA of ATM end system 30a) to its ATM SE 38b in ATM end system 30b, so that a connection request from ATM end system 30a associated with AAL2 node 32a will be a recognized calling party by ATM end system 30b associated with AAL2 node 32b.

Now, referring to FIGS. 5–6 given the preconditions outlined above, it will be described how an AAL2 path is dynamically established in AAL2 signaling relation 52 according to this exemplary embodiment. Master AAL2 SE 44a begins the AAL2 path establishment process by requesting a reservation of an AAL2 mux from its AAL2 mux pool 42a (step 1a in FIG. 6). In response to the request, AAL2 mux pool 42a reserves an available AAL2 mux 40a (step 1b in FIG. 6). The reserved AAL2 mux 40a reserves an ATM access point in the ATM U-plane 36a (step 1c in FIG. 6). The ATM U-plane provides the ATM connection identifier associated with the reserved access point, this ATM connection identifier being used when signaling towards the ATM network. Although not shown in FIG. 6, the requested reservation is acknowledged from ATM U-plane 36a to AAL2 mux 40a, from AAL2 mux 40a to mux pool 42a, and from the mux pool 42a to the master AAL2 SE 44a. An AAL2 path identity (e.g., the first free path identity in the relevant AAL2 signaling relation) is assigned by master AAL2 SE 44a to reserved AAL2 mux 40a. In certain embodiments, this path may be considered locally blocked in AAL2 node 32a at this point.

Still referring to FIGS. 5–6, master AAL2 SE 44a then requests ATM SE 38a to set up an ATM connection from its reserved AAL2 mux 40a to an AAL2 mux using the remote ATM end system 30b (step 2 in FIG. 6). Here, the ATM connection identifier discussed above of the reserved AAL2 mux 40a identifies the ATM connection end point in the first ATM end system 30a, while the destination AESA identifies the remote or second ATM end system 30b. ATM SE 38a of ATM end system 30a then requests set up of an ATM network connection to the remote or second ATM end system 30b (step 3a in FIG. 6), e.g., by providing the originating ATM connection identifier, the destination AESA, and its originating AESA (AESA of end system 30a). A set up indicator is then provided from the network to ATM SE 38b of the remote ATM end system 30b (step 3b in FIG. 6).

Using the originating AESA (i.e., AESA of end system 30a) in the received setup message, ATM SE 38b of the remote end system 30b finds/locates the relevant slave AAL2 SE 44b in the remote AAL2 node 32b (step 4 in FIG. 6). ATM SE 38b is able to locate the relevant slave AAL2 SE 44b because of the prior registration of the slave AAL2 SE 44b to the ATM SE in the aforesaid precondition. Then, the destination ATM connection identifier of the connection endpoint in ATM end system 30b is selected by the ATM network, and ATM SE 39b forwards the destination ATM connection identifier to the AAL2 SE 44b.

Slave AAL2 SE 44b then requests reservation of an AAL2 mux 40b from its AAL2 mux pool 42b (step 5a in FIG. 6). The preselected destination ATM connection identifier is provided in this request. In response to this request, the mux pool 42b reserves an available AAL2 mux 40b (step 5b in FIG. 6). The reserved AAL2 mux 40b then reserves the ATM access point in the ATM U-plane 36b which corresponds to the preselected destination ATM connection identifier (step 5c in FIG. 6). In certain embodiments, though not shown in FIG. 6, the requested reservation may be acknowledged from ATM U-plane 36b to the AAL2 mux 40b, from the mux 40b to the mux pool 42b, and from the mux pool 42b to the slave AAL2 SE 44b. An AAL2 path identity (e.g., the first free path identity in this AAL2 signaling relation) is assigned by slave AAL2 SE 44b to the AAL2 mux 40b. Optionally, at this point this AAL2 path is considered to be remotely blocked.

The slave AAL2 SE 44b then responds to the ATM SE 38b confirming one or more of the above (step 6 in FIG. 6). ATM SE 38b of end system 30b then confirms the above to ATM SE 38a of end system 30a (step 7 in FIG. 6). ATM SE 38a then confirms the setup of the ATM connection to master AAL2 SE 44a (step 8 in FIG. 6). The ATM connection (i.e., AAL2 path) is now established in the AAL2 signaling relation 52 between the respective the AAL2 nodes 32a and 32b, but is still locally blocked in AAL2 node 32a. Master AAL2 SE 44a then sends an unblock request message (this is a Q2630.1 message) to the slave AAL2 SE 44b (step 9 in FIG. 6), the unblock request message pointing out the AAL2 path with its assigned AAL2 path identifier. The slave AAL2 SE 44b responds to the master AAL2 SE 44a with an unblock confirm message (this is also a Q.2630.1 message) (step 10 in FIG. 6). Accordingly, an AAL2 path between the master AAL2 SE 44a in the first AAL2 node and the slave AAL2 SE 44b in the second AAL2 node is now established and unblocked, and can be used for establishment of AAL2 connections in AAL2 signaling relation 52.

FIG. 6 and the corresponding description thereof set forth above show/describe how an AAL2 path may be established in signaling relation 52 according to an exemplary embodiment of this invention. However, there also exists a need in the art for releasing/dropping AAL2 path(s) from AAL2 signaling relation 52.

FIG. 7 shows how an AAL2 path may be dropped or released in AAL2 signaling relation 52 (see FIG. 5) according to an exemplary embodiment of this invention. Before describing the dropping/releasing of the path, the following pre-conditions are assumed/apply in this embodiment: (1) prior to release of the AAL2 path in relation 52, AAL2 SE 44a in first AAL2 node 32a determined/identified excessive AAL2 mux resources towards second AAL2 node 32b (see FIG. 9 and corresponding description); (2) in an AAL2 signaling relation 52, only one AAL2 path can be released at a time; and (3) in AAL2 signaling relation 52 between AAL2 nodes 32a and 32b, AAL2 SE 44a in first AAL2 node 32a is the master and AAL2 SE 44b in the second AAL2 node 32b is the slave (i.e., the master is responsible for initiating release of established AAL2 paths which are no longer needed in the relation 52).

Referring to FIGS. 5 and 7 given the preconditions outlined above, it will now be described how an AAL2 path is dynamically released/dropped from AAL2 signaling relation 52 according to this exemplary embodiment. To prepare for removal/release of an AAL2 path in the AAL2 signaling relation 52 towards second AAL2 node 32b, master AAL2 SE 44a in first AAL2 node 32a makes the AAL2 path unavailable for new connections. Master AAL2 SE 44a sends a block request message (this is a Q.2630.1 message) to its slave AAL2 SE 44b at node 32b (step 1 in FIG. 7). The block request message identifies the AAL2 path to be released/dropped with its assigned AAL2 path identifier. Accordingly, at node 32b, the AAL2 path is now considered to be remotely blocked. Slave AAL2 SE 44b responds with a block confirmation message (this is a Q.2630.1 message) to master AAL2 SE 44a (step 2 in FIG. 7). The relevant AAL2 path is now considered locally blocked at AAL2 node 32a.

Connections already or previously established on the "blocked" AAL2 path are not affected by the blocking procedure (i.e., they remain in place), but new AAL2 connections will not be established on such blocked paths. In this regard, the number of established AAL2 connections will gradually decrease due to normal expiration/release of such connections until the AAL2 path is empty or substantially empty and can be released. In order to allow connections to empty out before release of same, in certain optional embodiments of this invention a delay (e.g., delay of from about 0.5 to 10 seconds) can be designed into the system to be implemented immediately after step 2 in FIG. 7.

Still referring to FIGS. 5 and 7, following step 2 in FIG. 7, master AAL2 SE 44a requests ATM SE 38a in the related ATM end system 30a to release the ATM connection (AAL2 path) between ATM end system 30a and the remote ATM end system 30b (step 3 in FIG. 7). In response, ATM SE 38a then requests release of the ATM network connection by forwarding a release request message via the network to the peer ATM SE 38b (step 4 in FIG. 7). ATM SE 38b in second ATM end system 30b then indicates release of the AAL2 path to the slave AAL2 SE 44b (step 5 in FIG. 7). Slave AAL2 SE 44b then requests its AAL2 mux pool 42b to release the AAL2 mux 40b that is associated with the AAL2 path at issue (step 6a in FIG. 7). The mux pool 42b in response requests release of the AAL2 mux 40b associated with the AAL2 path (step 6b in FIG. 7). The AAL2 mux 40b in response requests release of the ATM access point in the ATM U-plane 36b (step 6c in FIG. 7). The requested release is acknowledged from ATM U-plane 36b to AAL2 mux 40b, from AAL2 mux 40b to AAL2 mux pool 42b, and from pool 42b to slave AAL2 SE 44b. The AAL2 path identity is thus freed by slave AAL2 SE 44b.

Slave AAL2 SE 44b then responds to the ATM SE 38b (step 7 in FIG. 7). ATM SE 38b then confirms the release to ATM SE 38a in the first end system 30a (step 8 in FIG. 7). ATM SE 38a then confirms the release of the ATM connection to master AAL2 SE 44a (step 9 in FIG. 7). Upon receiving such confirmation of the release, master AAL2 SE 44a requests AAL2 mux pool 42a to release the AAL2 mux 40a that is associated with the AAL2 path at issue (step 10a in FIG. 7). Mux pool 42a then requests release of the AAL2 mux 40a (step 10b in FIG. 7). The AAL2 mux 40a at issue then requests release of the ATM access point in the ATM U-plane 36a (step 10c in FIG. 7). The requested release may be acknowledged from ATM U-plane 36a to AAL2 mux 40a, from AAL2 mux 40a to mux pool 42a, and from the mux pool 42a to the master AAL2 SE 44a. The AAL2 mux 40a is released and returned to the pool and the AAL2 path identity is freed up by master AAL2 SE 44a which means that the ATM connection (AAL2 path) is removed from the AAL2 signaling relation 52. When the AAL2 path is released, the AAL2 mux released is returned to its respective AAL2 mux pool 42a in each AAL2 node so that thereafter these AAL2 muxes 40a, 40b are free to be allocated for other AAL2 paths to be formed/established.

FIGS. 4–7 above describe how AAL2 paths can be dynamically established and/or released according to certain embodiments of this invention. FIGS. 8–9, to be described below, illustrate how it is determined (e.g., by the master AAL2 SE) when it is necessary to dynamically add or remove AAL2 mux(es) to/from an AAL2 signaling relation according to different embodiments of this invention. The system of FIGS. 1–9 may be utilized together as one overall system in certain embodiments of this invention. However, in alternatively embodiments, the determination of FIG. 8 may be provided in the system but not the determination of FIG. 9, and vice versa. In still other embodiments, one or both of the embodiments of FIGS. 8–9 may be used without the embodiments of FIGS. 5–7, and vice versa.

FIGS. 8–9 illustrate how it may be determined whether or not to add or release an AAL2 mux(es) from the relation 52 per the procedures of FIGS. 5–7. In particular, FIGS. 8–9 show how to detect a lack of AAL2 mux resources (FIG. 8) or excessive AAL2 mux resources (FIG. 9) in an AAL2 signaling relation 52 between at least first and second AAL2 nodes. For purposes of FIGS. 8–9, the following assumptions are made: (1) the duration of an established AAL2 connection in an AAL2 mux 40a, 40b is less than "x" minutes (e.g., "x" may be 1–5 minutes, more preferably about 3 minutes in certain embodiments of this invention); (2) "x" matches or substantially matches the variation in time of the traffic load in different AAL2 signaling relations from/to the relevant AAL2 node, wherein matching is fulfilled if AAL2 muxes are available when needed in different AAL2 signaling relations (i.e., when an AAL2 mux is taken out of service (establishment of new AAL2 connections through that AAL2 mux in the relation 52 is prevented, or the AAL2 mux is made unavailable for new connections in the relation 52), all already established AAL2 connections in the mux will be naturally released in less than "x" minutes/ seconds; thereby enabling the AAL2 SE to free the mux in time to make the mux available for another signaling relation where it may be needed due to increased traffic load); (3) the amount of resources in an AAL2 mux needed to support an established AAL2 connection is always the same (implying no need to consider how usage of mux resources is distributed); and (4) all AAL2 muxes provide the same amount of resources (e.g., the number of established AAL2 connections than an AAL2 mux can support is at least 100).

Given the above assumptions, FIG. 8 illustrates how the system determines whether to add a new mux(es) to a signaling relation 52 based upon whether there is detected a lack of AAL2 mux resources for a particular relation 52. This determination/detection process may take place, for example, whenever an AAL2 SE starts and there are no AAL2 muxes in the AAL2 signaling relation and/or after each establishment of a new AAL2 connection in the AAL2 signaling relation 52. Thus, in step 50 it is determined whether or not a new AAL2 connection has just been established or whether an AAL2 SE is starting with no AAL2 mux(es) in the signaling relation. If the answer to both of these determinations is no, then the process will not continue further and step 50 will be repeated until the answer to one of the queries is yes. When the answer to one of the step 50 queries is yes, the process proceeds on to step 52 where the amount of available resources (AR) in the applicable total AAL2 mux group of the AAL2 signaling relation 52 is determined. This determination may be made by the master AAL2 SE in the AAL2 signaling relation, for example. Once, AR has been determined, in step 54 it is determined whether or not AR is less than (or no greater than) "Y" percent (%) of the resources that an AAL2 mux 40 provides (e.g., "Y" may be 5–50%, more preferably from about 10–40%, and most preferably from about 15—25% (e.g., 20%) in certain embodiments of this invention). If not, then no new mux is added and the process goes back to step 50.

If AR is less than "Y" in step 54, then the master AAL2 SE examines if it already has an AAL2 mux that is taken out of service but still reserved for the signaling relation; in that case it should take this AAL2 mux in service instead of reserving a new mux and establishing a new AAL2 path (an AAL2 mux that is taken out of service may be able to provide available resources that makes AR greater than "Y" when taken in service, due to the fact that when an AAL2 mux is taken out of service it is at that moment the AAL2 mux that has the greatest amount of resources free for allocation in certain exemplary embodiments, i.e., at least resources for one AAL2 connection is likely free). If AR is less than "Y" in step 54, and no AAL2 mux out of service is reserved for the relation, then in step 56 a new AAL2 mux (40a or 40b) is added to the signaling relation 52 (this new mux may be added directly to the relation 52, or alternatively may be made available in the relevant mux pool of the relevant AAL2 SE). Preferably, in step 56 a new AAL2 path is added to the relevant AAL2 signaling relation 52 as shown in FIG. 6 and described above, in response to a "yes" answer to the step 54 inquiry.

Given the above assumptions, FIG. 9 illustrates how the system determines whether to drop/release new mux(es) to a signaling relation 52 based upon whether here is detected excessive AAL2 mux resources for the relation 52. This determination/detection process may take place, for example, following each release of an AAL2 connection in the AAL2 signaling relation 52. Thus, in step 60 it is determined whether or not an AAL2 connection has just been released from the signaling relation. This determination may be performed by the master AAL2 SE in the AAL2 signaling relation in certain embodiments. If the answer to this query is no, then the process will not continue further and step 60 will be repeated. However, if the answer to the step 60 query is yes, then the process proceeds on to step 62 where the amount of available resources (AR) in the applicable total AAL2 mux group of the AAL2 signaling relation 52 is determined. This determination may be made by, for example, the master AAL2 SE in the AAL2 signaling relation. Once, AR has been determined, in step 64 it is determined whether or not AR is greater than (or no less than) "Z" percent (%) of the resources that an AAL2 mux 40 provides (e.g., "Z" may be from about 140–200%, more preferably from about 155–185%, or even more preferably from about 160–180% in certain embodiments of this invention). If not, then no mux is released and the process goes back to step 60. However, if the answer to the step 64 inquiry is yes, then an AAL2 mux is dropped from the signaling relation 52 in step 66 (i.e., the AAL2 mux is taken out of service (its resources will not add to the AR) but may remain reserved for the signaling relation until all AAL2 connections in the AAL2 mux are released). When all AAL2 connections in the AAL2 mux are released, then it is time for removal procedures according to FIG. 7. In certain exemplary embodiments, the AAL2 mux 40 with the least number of established AAL2 connections may be selected for removal in step 66. Preferably, in step 66 an AAL2 path is released from the relation 52 as shown in FIG. 7 and described above, in response to a "yes" answer to the step 64 query. In such a manner, the mux resources for each AAL2 signaling relation are dynamically kept at an appropriate level so as to enable the system for continuously function in an efficient manner.

FIG. 10 illustrates a cellular telecommunications network in which any and/or all of the FIGS. 1–9 embodiments of this invention may be implemented. For example, ATM end system nodes 30 and AAL2 nodes 32 in the above embodiments may be base stations (BSs), radio network controllers (RNCs), or MSC nodes in the FIG. 10 network. A mobile radio cellular telecommunications system 100 is shown in FIG. 10 and may be, for example, a CDMA or a wideband CDMA communications system. Radio network controllers (RNCs) 112 and 114 control various radio network functions including for example radio access bearer setup, diversity handover, etc. More generally, each RNC directs mobile station calls via the appropriate base station(s). Radio network controller 112 is coupled to a plurality of base stations 116, 118, and 120. Radio network controller 114 is coupled to base stations 122, 124, and 126. Each base station (BS) serves a geographical area that can be divided into one or more cell(s). Base station 126 is shown as having five antenna sectors S1–S5, which can be said to make up the cell of the BS 126. The base stations are coupled to their corresponding radio network controller (RNC) by a digital link established via dedicated telephone lines, optical fiber links, microwave links, etc. This digital link may utilize the ATM inventions associated with this invention above. Both radio network controllers (RNCs) 112 and 114 are connected with external networks such as the Public Switched Telephone Network (PSTN), the Internet, etc. through one or more core network nodes like a mobile switching center (MSC) and/or a packet radio service node (not shown). Again, ATM inventions herein may be utilized between RNC nodes, MSC nodes, and other core network nodes to enable efficient ATM communication.

In FIG. 10, two mobile stations 128 and 130 are shown communicating with plural base stations in diversity handover situations. Mobile station 128 communicates with base stations 116, 118, and 120, and mobile station 130 communicates with base stations 120 and 122. An ATM control link between radio network controllers 112 and 114 permits diversity communications to/from mobile station 130 via base stations 120 and 122. Each radio communication channel established between a mobile station and a base station has an uplink (UL) component and a downlink (DL) component. Since multiple communications utilize the same radio frequencies in CDMA communication, spreading codes along with other well-known CDMA techniques are used to distinguish between the various mobile station and base station communications. In this example embodiment, the term "channel" refers to a CDMA channel which, for any mobile station, is defined in terms of an RF frequency and a particular code sequence.

While the ATM inventions of FIGS. 1–9 may be implemented in BS nodes, RNC nodes, and MSC nodes of the cellular telecommunications network of FIG. 10, it will be recognized by those skilled in the art that this invention is not so limited. Thus, the ATM inventions of FIGS. 1–9 may also be used in other types of ATM communications networks not limited to those associated with cellular systems.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In an Asynchronous Transfer Mode (ATM) network, a method of adding or removing ATM Adaptation Layer 2 (AAL2) mux(es) to or from an AAL2 signaling relation existing between first and second AAL2 nodes, the method comprising:

providing the first and second AAL2 nodes;

determining an amount of available resources in an AAL2 mux group of the AAL2 signaling relation;

comparing the determined amount of available resources in the AAL2 mux group of the AAL2 signaling relation with at least one predetermined value; and based upon a result of said comparing step, adding or removing an AAL2 mux to or from the AAL2 signaling relation.

2. The method of claim 1, further comprising:

adding an AAL2 mux to the AAL2 signaling relation when it is determined in said comparing step that the amount of available resources in the AAL2 mux group of the AAL2 signaling relation is less than a predetermined value "Y."

3. The method of claim 2, wherein the predetermined value "Y" represents a percentage of resources than an AAL2 mux in the mux group provides.

4. The method of claim 3, further comprising:

removing an AAL2 mux from the AAL2 signaling relation when it is determined in said comparing step that the amount of available resources in the AAL2 mux group of the AAL2 signaling relation is greater than a predetermined value "Z."

5. The method of claim 4, wherein the predetermined value "Z" represents a percentage of resources than an AAL2 mux in the mux group provides, and wherein "Z" is greater than "Y."

6. The method of claim 1, further comprising dynamically establishing an AAL2 path in the AAL2 signaling relation and wherein the AAL2 mux is added to the signaling relation in a context of establishing the AAL2 path in the AAL2 signaling relation.

7. The method of claim 1, further comprising dynamically releasing an AAL2 path in the AAL2 signaling relation in response to the result of said comparing step, and wherein the AAL2 mux is removed from the signaling relation in a context of releasing the AAL2 path from the AAL2 signaling relation so that the AAL2 mux released goes back to an AAL2 mux pool for later use in another AAL2 signaling relation.

8. The method of claim 1, wherein said adding an AAL2 mux to the AAL2 signaling relation comprises establishing a new AAL2 path in the AAL2 signaling relation between the first and second nodes.

9. The method of claim 1, wherein said removing an AAL2 mux from the AAL2 signaling relation comprises releasing an AAL2 path from the AAL2 signaling relation between the first and second nodes.

10. In an Asynchronous Transfer Mode (ATM) network, a method of establishing or releasing ATM Adaptation Layer 2 (AAL2) path(s) in or from an AAL2 signaling relation existing between first and second AAL2 nodes, the method comprising:

determining an amount of available resources in an AAL2 mux group of the AAL2 signaling relation; and based at least upon said determining, dynamically establishing or removing an AAL2 path from the AAL2 signaling relation.

11. The method of claim 10, further comprising:

comparing the determined amount of available resources in the AAL2 mux group of the AAL2 signaling relation with at least one predetermined value; and based at least in part upon said a result of said comparing, dynamically establishing or removing an AAL2 path from the AAL2 signaling relation.

12. The method of claim 10, further comprising establishing an AAL2 path in the AAL2 signaling relation by at least:

a master AAL2 SE at the first AAL2 node reserving an AAL2 mux from an AAL2 mux pool at the first AAL2 node;

the master AAL2 SE sending a setup request message to an ATM SE at an ATM end system node associated with the first AAL2 node; and the ATM SE sending a setup request message to an ATM SE at an ATM end system node associated with the second AAL2 node; and the ATM SE at the ATM end system node associated with the second AAL2 node sending a setup confirmation message to the ATM SE at the ATM end system node associated with the first AAL2 node.

13. The method of claim 12, wherein said establishing an AAL2 path in the AAL2 signaling relation further comprises the first AAL2 node sending an unblock request for the AAL2 path to the second AAL2 node, and the second AAL2 node sending an unblock confirmation message to the first AAL2 node.

14. An AAL2 node for use in an ATM network, the AAL2 node comprising:

an AAL2 mux pool for storing a list of AAL2 muxes in the AAL2 node;

an AAL2 signaling entity (AAL2 SE) for providing multiplexing of AAL2 connections on established AAL2 paths between said AAL2 node and other AAL2 nodes; and wherein said AAL2 SE dynamically establishes and releases AAL2 paths from an AAL2 signaling relation based upon available resources in an AAL2 mux group associated with the AAL2 signaling relation.

15. The AAL2 node of claim 14, further comprising means for comparing the available resources with at least one predetermined value indicative of a percentage of resources of an AAL2 mux in said group, and wherein said AAL2 SE dynamically establishes and releases AAL2 paths from the AAL2 signaling relation based upon results of said comparing.

16. The AAL2 node of claim 15, wherein an AAL2 path is established in the AAL2 signaling relation by:

the AAL2 SE reserving an AAL2 mux from the AAL2 mux pool; and the master AAL2 SE sending a setup request message to another node.

* * * * *